Sept. 21, 1954    H. P. STABLER    2,689,911
SWEEP VOLTAGE GENERATOR
Filed Sept. 24, 1946

INVENTOR
HOWARD P. STABLER

BY *M. A. Hayes*

ATTORNEY

Patented Sept. 21, 1954

2,689,911

UNITED STATES PATENT OFFICE 2,689,911

SWEEP VOLTAGE GENERATOR

Howard P. Stabler, Williamstown, Pa., assignor, by mesne assignments, to the United States of America as represented by the Secretary of the Navy Application September 24, 1946, Serial No. 699,045

9 Claims. (Cl. 250—27)

This invention relates to sweep voltage generators and more particularly to linear sweep voltage generators that are synchronized with apparatus undergoing mechanical motion.

This application is a continuation-in-part of my co-pending application entitled "V-Beam Height Indicator," Serial No. 699,044, filed September 24, 1946, now U. S. Patent No. 2,646,563 of July 21, 1953, and hereinafter referred to as the parent application.

In the parent application a system is disclosed for the determination of the azimuth angle between the vertical beam radar echo pulse and the slant beam radar echo pulse in a V-beam radar system. As the azimuth angle determination is made on the screen of a cathode ray tube, it becomes essential to have a linear azimuth sweep voltage generator synchronized with the rotation of the antenna system. This sweep voltage generator may take the form of a conventional resistance-capacitance sweep circuit that derives its synchronization from being triggered by the antenna system as it passes through a predetermined azimuth angle. The main objection to the use of this type of sweep voltage generator is that changes in the rate of rotation of the antenna system cause errors in the calibration of the azimuth sweep on the screen of the cathode ray tube.

A sweep voltage generator utilizing a potentiometer mechanically responsive to the rotation of the antenna system would produce an azimuth sweep voltage that would maintain synchronization with the antenna system and calibration on the screen of the cathode ray tube despite variation in the rate of rotation of the antenna system. The primary objection to this type of sweep voltage generator is the difficulty of obtaining potentiometers having the required linearity and long life.

It is therefore a primary object of this invention to provide a linear sweep voltage generator.

Another object of this invention is to provide a linear sweep voltage generator synchronized with a mechanical movement.

A further object is to provide a linear sweep voltage generator synchronized with a mechanical motion which undergoes variations in velocity.

Figure 1:
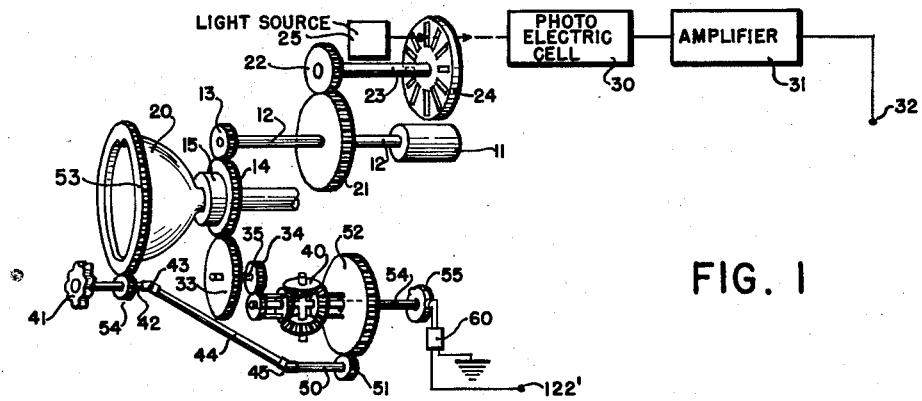
Figure 2:
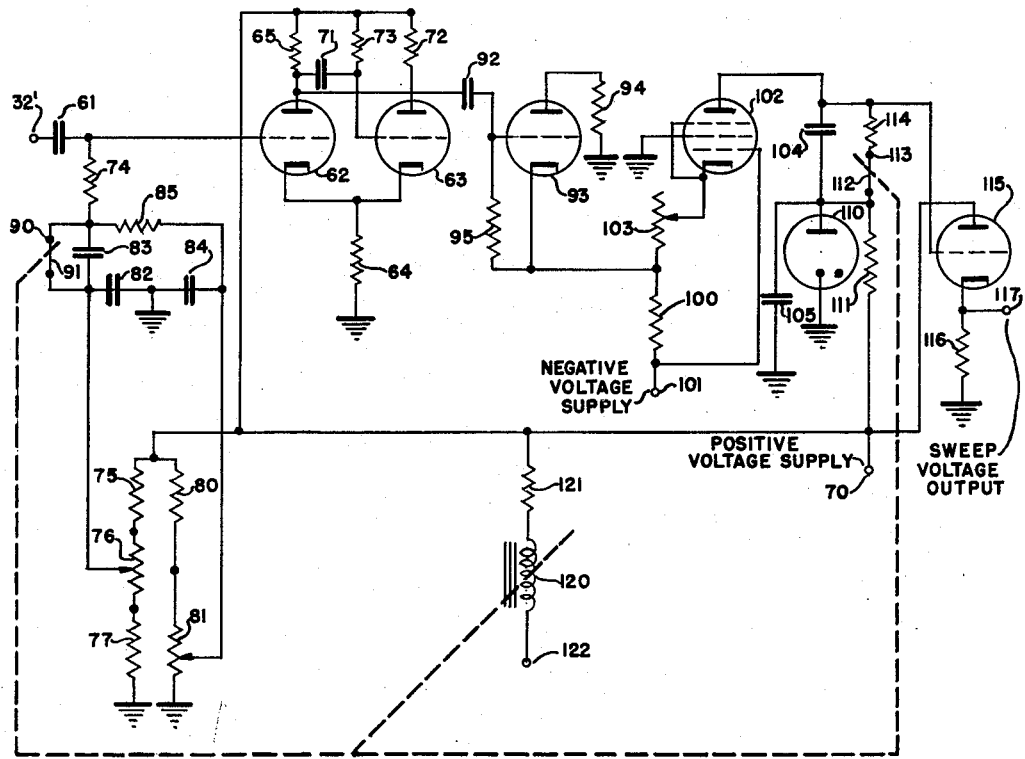

These and other objects of this invention will be apparent to those skilled in the art from the following description when taken with the accompanying drawings in which:

Fig. 1 is a mechanical schematic illustration of the step pulse generator and azimuth sweep initiating switch; and Fig. 2 is a schematic illustration of one embodiment of the step sweep voltage generator.

Referring to the drawings and more particularly to Fig. 1, Selsyn motor 11 is electrically connected to a Selsyn generator located on the antenna system (not shown). Shaft 12 of Selsyn motor 11 drives through pinion 13 and gear 14 magnetic deflection coils 15 of cathode ray tube 20 at a rate just equal to the rate of rotation of the antenna system. As magnetic deflection coils 15 are electrically connected to a range sweep voltage generator (not shown), a plan position indication is presented on the screen of cathode ray tube 20. Shaft 12 also imparts rotation through gear 21, pinion 22, and shaft 23 to slotted disc 24. Light source 25 is located on one side of slotted disc 24 and photoelectric cell 30 is located on the other side so that as slotted disc 24 is rotated, the slots cause the light beam from light source 25 to fall upon photoelectric cell 30 in pulses. These pulses of light are transformed by photoelectric cell 30 into voltage pulses that are amplified by amplifier 31 and made available at terminal 32. The gear ratio between Selsyn motor 11 and slotted disc 24 in conjunction with the number of slots in slotted disc 24 produce thirty pulses of light on photoelectric cell 30 per degree of rotation of the antenna system.

Gear 14 not only serves to rotate magnetic deflection coils 15, but also supplies mechanical rotation through gears 33 and 34 and shaft 35 to an input of differential gear 40. Mechanical rotation may also be imparted to differential gear 40 from azimuth position knob 41 through shaft 42, universal joint 43, shaft 44, universal joint 45, shaft 50, pinion 51, and gear 52. Azimuth position knob 41 also serves to position dial pointer disc 53 on cathode ray tube 20 by means of gear 54. The output from differential gear 40 obtained on shaft 54 rotates cam 55 in response to the combined rotation of dial pointer 53 and magnetic deflection coils 15. Cam 55 operates to close sequence switch 60 during an arc of rotation of magnetic deflection coils 15, the angular position of the arc being determined by the position of dial pointer 53. The arc length during which sequence switch 60 remains closed determines the azimuth angle covered by the azimuth sweep voltage output as hereinafter explained.

Referring to Fig. 2, the voltage pulses available at terminal 32 of Fig. 1 are applied at terminal 32' of Fig. 2 and are coupled through coupling condenser 61 to the grid of triode electron tube 62 which in conjunction with triode electron tube 63 serves as a self-restoring cathode-coupled multivibrator. The cathodes of triodes 62 and 63 are connected together and to ground through cathode resistor 64. The plate of triode 62 is connected through plate load resistor 65 to the positive voltage supply at terminal 70, and also is coupled through condenser 71 to the grid of triode 63. The plate of triode 63 is connected through plate load resistor 72 to the positive voltage supply at terminal 70, and the grid of triode 63 is also connected to terminal 70 through isolating resistor 73.

A bias voltage source is connected to the grid of triode 62 through isolating resistor 74. This voltage source comprises two voltage dividers between the positive voltage supply at terminal 70 and ground; the first consisting of resistor 75, the total resistance of potentiometer 76 and resistor 77, and the second consisting of resistor 80 and the total resistance of potentiometer 81. The contact arm of potentiometer 76 is connected to ground through condenser 82 and also to one side of charging condenser 83; and the contact arm of potentiometer 81 connects to ground through condenser 84 and through charging resistor 85 to the other side of charging condenser 83. This connection applies an adjustable voltage to the series charging circuit of charging condenser 83 and charging resistor 85. The bias voltage for triode 62 is obtained from the junction of condenser 83 and resistor 85. One terminal of condenser 83 is connected to relay contact 90 and the other terminal to relay contactor 91 so that with relay contactor 91 in the unenergized position, condenser 83 is short-circuited.

An output from the multivibrator circuit is obtained from the plate of triode 62 and coupled through coupling condenser 92 to the grid of the triode electron tube 93. Triode 93 has its plate connected to ground through plate load resistor 94, its grid connected to its cathode through resistor 95, and its cathode also connected through cathode resistor 100 to the negative voltage supply at terminal 101.

Pentode electron tube 102 is connected as a constant current device having the cathode connected through rheostat 103 to the cathode of triode 93, the control grid connected to the negative voltage supply at terminal 101, the screen grid grounded, the suppressor grid connected to the cathode, and the plate connected through condenser 104 and dropping resistor 111 to the positive voltage supply at terminal 70. In order to provide a constant operating voltage for the plate circuit of pentode 102, voltage regulator tube 110 has its plate connected to the junction of condenser 104 and resistor 111 and its cathode connected to ground; and condenser 105 is connected between the plate and cathode of voltage regulator tube 110. Relay contactor 112, relay contact 113, and resistor 114 are connected across condenser 104 in such a way that when relay contactor 112 is in the unenergized position, resistor 114 is placed in parallel with condenser 104.

The plate of pentode 102 is directly connected to the grid of triode electron tube 115. Triode electron tube 115 is connected as a cathode follower with the plate connected directly to the positive voltage supply at terminal 70 and the cathode connected to ground through register 116 and to sweep voltage output terminal 117.

Relay operating coil 120 which operates simultaneously relay contactor 91 and relay contactor 112 is connected in series with resistor 121 between the positive voltage supply at terminal 70 and terminal 122. Terminal 122 is connected to terminal 122' of Fig. 1 which in turn is connected to one terminal of sequence switch 60. The other terminal of sequence switch 60 is connected directly to ground.

In the operation of this embodiment of the invention, Selsyn motor 11 causes continuous rotation of slotted disc 24, magnetic deflection coils 15, and sequence switching cam 55. During the period when sequence switch 60 is open, relay operating coil 120 is deenergized and relay contactor 91 is closed against relay contact 90; and relay contactor 112 is closed against relay contact 113. Under these conditions of relay operation, each of the voltage pulses occurring at terminal 32' for every thirtieth of a degree of antenna rotation triggers triode 62 producing, due to multivibrator action, a negative voltage gate which is coupled to the grid of triode 93. During the application of the negative voltage gate on its grid, triode 93 becomes non-conducting and due to the decrease in current flowing through resistor 100 pentode 102 becomes conducting during the application of the negative voltage gate to the grid of triode 93. As relay contactor 112 is in contact with relay contact 113, condenser 104 remains in an uncharged condition.

When sequence switch 60 is closed by cam 55, relay operating coil 120 is energized and relay contactor 91 and 112 are opened. Considering initially the operation when the contact arm of potentiometer 76 and the contact arm of potentiometer 81 are at the same potential, the bias voltage on triode 62 remains fixed and the negative voltage gate applied to triode 93 is of a constant fixed length. This constant gate length causes pentode 102 to be conducting for a fixed interval for every thirtieth of a degree of rotation of the antenna system, and as relay contactor 112 is open, condenser 104 is charged from a regulated voltage source resulting in a fixed amount of charge being added to condenser 104 for every thirtieth of a degree of antenna rotation. The result of the accumulating charge on condenser 104 is to provide a voltage on the grid of triode 115 that decreases in equal incremental steps in synchronism with the rotation of the antenna system. This produces at treminal 117 an azimuth sweep voltage output linear with respect to the rotation of the antenna system.

If there is any leakage of charge across condenser 104, the linear relation between the azimuth angle of the antenna and the voltage output at terminal 117 will be destroyed by this leakage of charge. To correct this undesirable situation it requires that the length of the negative voltage gate output from triode 62 be increased with time to produce a greater charge increment to be added to condenser 104 to replace the charge lost by leakage. The length of the voltage gate output from triode 62 may be varied by changing the value of the bias voltage applied to the grid of triode 62. This change of bias is accomplished by changing the position of the arm of potentiometer 81 so that its potential is somewhat greater than the potential at the arm of potentiometer 76. This results in a difference of potential being applied across the series circuit composed of condenser 83 and resistor 85, condenser 83 acquiring a charge at a rate substantially dependent upon the time constant of condenser 83 and resistor 85, and the difference of potential applied across them.

As condenser 83 becomes charged the voltage applied to the grid of triode 62 is more positive with the result that triode 62 conducts more heavily during its conducting portion of the cycle. As a result of the increased flow of current through triode 62, the cathode potential of triode 62, and hence triode 63, becomes more positive. The grid of triode 63 must, therefore, be raised to a higher potential by the charging of condenser 71 to cause triode 63 to become conducting. The increased charge required on condenser 71 requires an increased charging time and as the length of the voltage gate output depends upon the time required for condenser 71 to raise the potential of the grid of triode 63 to the conducting level, the voltage gate output will be lengthened due to the raising of the grid potential of triode 62 by the charging of condenser 83. This causes the charge increments added to condenser 104 to be increased to make allowance for leakage that occurs across condenser 104 and produce a sweep voltage output that is linear with respect to angular displacement of the antenna system.

When sequence switch 60 is opened by the action of cam 55, relay contactor 112 closes on relay contact at 113 discharging condenser 104 through resistor 114 and thereby stopping the linear rise in the sweep voltage output at output terminal 117. Relay contactor 91, at the same time, comes in contact with relay contact 90, discharging condenser 83.

Although the description of this embodiment of the invention has dealt mainly with its use in conjunction with V-beam radar systems, it is not intended that the invention be limited to the details shown, which are considered to be illustrative of one form the invention may take. The scope of the invention is defined by the appended claims.

What is claimed is:

1. A linear step sweep voltage generator capable of synchronization with the translational or rotational motion of a structure comprising, a slotted disc photoelectric voltage pulse generator being mechanically synchronized with said structure, first and second electron tubes each having at least a cathode, an anode, and a control grid, a first resistance, the cathod of said first and second electron tubes being connected together and then to ground through said first resistance, second and third resistances, a positive voltage supply, the plates of each of said first and second electron tubes being connected to the positive voltage supply through said second and third resistances respectively, a first condenser, said first condenser connected between the grid of said second electron tube and the plate of said first electron tube, means to couple the output from said photoelectric pulse generator to the grid of said first electron tube, a gate tube circuit, means to couple the rectangular voltage waveform occurring at the plate of said first electron tube to the input of said gate tube circuit, a constant current circuit, means to operate said constant current device during the length of the voltage gate appearing at the input of said gate tube circuit, a second condenser, said second condenser adapted to be charged in small increments by said constant current device, means to obtain a linear sweep voltage from said second condenser as it is charged by said constant current device, first switching means to discharge said second condenser between desired sweeps, a third condenser, a fourth resistance, means to charge said third condenser through said fourth resistance from said positive voltage supply, the voltage across said third condenser being applied to the grid of said first electron tube to cause the rectangular waveform at the plate of said first electron tube to change with time producing a linear sweep voltage output from said second condenser, and second switching means to discharge said second condenser between sweeps.

2. A linear step sweep voltage generator synchronized with the motion of a structure comprising, a slotted disc photoelectric voltage pulse generator mechanically synchronized with said structure, a cathode coupled self restoring multivibrator, said multivibrator adapted to produce a negative voltage gate output for each pulse received from said photoelectric pulse generator, a first electron tube having at least a cathode, an anode, and a control grid, a first condenser adapted to couple said negative voltage gate from said multivibrator to the grid of said first electron tube, a first resistance connected between the plate of said first electron tube and ground, a second resistance connected between the grid and cathode of said first electron tube, a negative voltage supply, a third resistance connected between the cathode of said first electron tube and said negative voltage supply, a second electron tube having a cathode, an anode, control grid, screen grid and suppressor grid, said second electron tube connected as a constant current device, a first variable resistance, the cathode and suppressor grid of said second electron tube being connected together and through said first variable resistance to the cathode of said first electron tube, the screen grid of said second electron tube being grounded, the control grid of said second electron tube being connected to said negative voltage supply, a positive voltage supply, a fourth resistance, a third electron tube having at least a cathode and an anode adapted to serve as a voltage regulating device having its plate connected through said fourth resistance to said positive voltage supply and its cathode connected to ground, a second condenser connected between the plate and cathode of said third electron tube, a third condenser connected between the plate of said second electron tube and the plate of said third electron tube, said third condenser being charged during the negative voltage gate output of said multivibrator, said charging of said third condenser producing a sweep voltage, switching means operated by the motion of said structure to discharge said third condenser, a fourth electron tube having at least a cathode, an anode, and a control grid, a fifth resistance, said fourth electron tube being connected as a cathode follower with its plate connected to said positive voltage supply, its grid connected to the plate of said second electron tube, and its cathode connected to ground through said fifth resistance, an output terminal connected to the cathode of said fourth electron tube, and means to change the length of said negative voltage gate output from said multivibrator to cause said third condenser to be charged linearly despite leakage of charge across said third condenser.

3. A step sweep voltage generator having a sweep voltage output varying in small incremental steps comprising, a source of voltage pulses, a square wave generator, said square wave generator producing a voltage gate output when triggered by each voltage pulse from said source of voltage pulses, a constant current device operative only during application thereto of said voltage gate output from said square wave generator, a condenser chargeable in small incremental steps from said constant current device, means for controlling said square wave generator output to compensate for leakage of said condenser, means to discharge said condenser periodically, and means for extracting a step sweep voltage output from said condenser.

4. Apparatus as in claim 3 wherein said source of voltage pulses comprises a light source, a photoelectric cell, a rotatable uniformly slotted disc disposed between said light source and said photoelectric cell, and an amplifier responsive to voltages produced by said photoelectric cell as said wheel rotates, said amplifier providing said voltage pulses.

5. A step sweep voltage generator capable of being synchronized with the translational or rotational motion of a structure of variable rate of motion comprising, means synchronized with the motion of said structure for producing voltage pulses, a multivibrator, said multivibrator providing a voltage gate output in response to each of said voltage pulses applied thereto, a constant current device conductive only during application thereto of said voltage gate output from said multivibrator, a condenser chargeable in small incremental steps from said constant current device, means for varying the length of said voltage gate output from said multivibrator to compensate for leakage of said condenser, means to obtain a step sweep voltage from said condenser, said step sweep voltage output being synchronized with the motion of said structure and means for discharging said condenser at predetermined time intervals between said step sweep voltage outputs.

6. Apparatus for providing a linear step sweep voltage synchronized with the variable rate of motion of a structure comprising, a slotted disc photoelectric voltage pulse generator synchronized with said structure, a cam driven in synchronism with said structure, a sequence switch operative in response to movement of said cam, a multivibrator for producing a voltage gate in response to each voltage pulse from said voltage pulse generator, a bias circuit for said multivibrator, means for varying components of said bias circuit for varying the bias voltage obtained therefrom, a constant current circuit including a pentode vacuum tube and a voltage regulator tube, a condenser, means for charging said condenser incrementally from said constant current circuit during periods of operation thereof, said periods of operation being determined by the duration of said voltage gates, said voltage gates being variable in duration in response to said bias circuit varying means, a relay for periodically discharging said condenser, said relay being controlled by said sequence switch, and means for deriving an output step sweep voltage from said condenser varying with motion of said structure.

7. A sweep voltage generator having a sweep voltage output varying in small incremental voltage steps comprising, a source of voltage pulses, a generator coupled to said pulse source and providing an output signal in response to each voltage pulse applied thereto, first storage means coupled to said generator and chargeable incrementally therefrom at a rate related to the time duration of said output signal, second storage means coupled to said generator for controlling said time duration, switch means for sequentially initiating charging and discharging of said first storage means, and means coupled to said switch means for synchronizing the charging and discharging of said second storage means with the charging and discharging of said first storage means.

8. A sweep voltage generator having a sweep voltage output varying in small incremental voltage steps comprising, a source of voltage pulses, a generator coupled to said pulse source and providing an output signal in response to each voltage pulse applied thereto, first energy storage means coupled to said generator and chargeable incrementally therefrom at a rate related to the time duration of said output signal, second energy storage means coupled to said generator for controlling said time duration, means for simultaneously initiating the charging of said first and second storage means, and means for simultaneously discharing said first and second storage means.

9. In a step sweep voltage generator comprising a source of voltage pulses, a square wave generator operative to produce an output signal in response to each voltage pulse applied thereto, a condenser adapted to be charged in equal incremental steps in response to the output of said square wave generator, and a cathode follower circuit connected to said condenser for providing a step sweep voltage varying with the charge on said condenser, means for initiating charging and discharging of said condenser, means for varying the time duration of the output pulses of said square wave generator to compensate for leakage of said condenser, and means for simultaneously initiating charging of said condenser and operation of said means for varying the time duration of the output pulses of said square wave generator.

References Cited in the file of this patent

UNITED STATES PATENTS

| Number | Name | Date |
|---|---|---|
| 1,937,021 | Hammond | Nov. 28, 1933 |
| 2,085,556 | Trainer | June 29, 1937 |
| 2,113,011 | White | Apr. 5, 1938 |
| 2,241,256 | Gould | May 6, 1941 |
| 2,275,460 | Page | Mar. 10, 1942 |
| 2,284,873 | Kemp | June 2, 1942 |
| 2,413,440 | Farrington | Dec. 31, 1946 |
| 2,438,950 | Smith, Jr. | Apr. 6, 1948 |
| 2,496,338 | Barton | Feb. 7, 1950 |
| 2,520,141 | Hardy | Aug. 29, 1950 |